May 27, 1930. J. P. SPICER 1,760,666
SAFETY EMERGENCY ATTACHMENT FOR WHEELS
Filed April 3, 1925 2 Sheets-Sheet 1
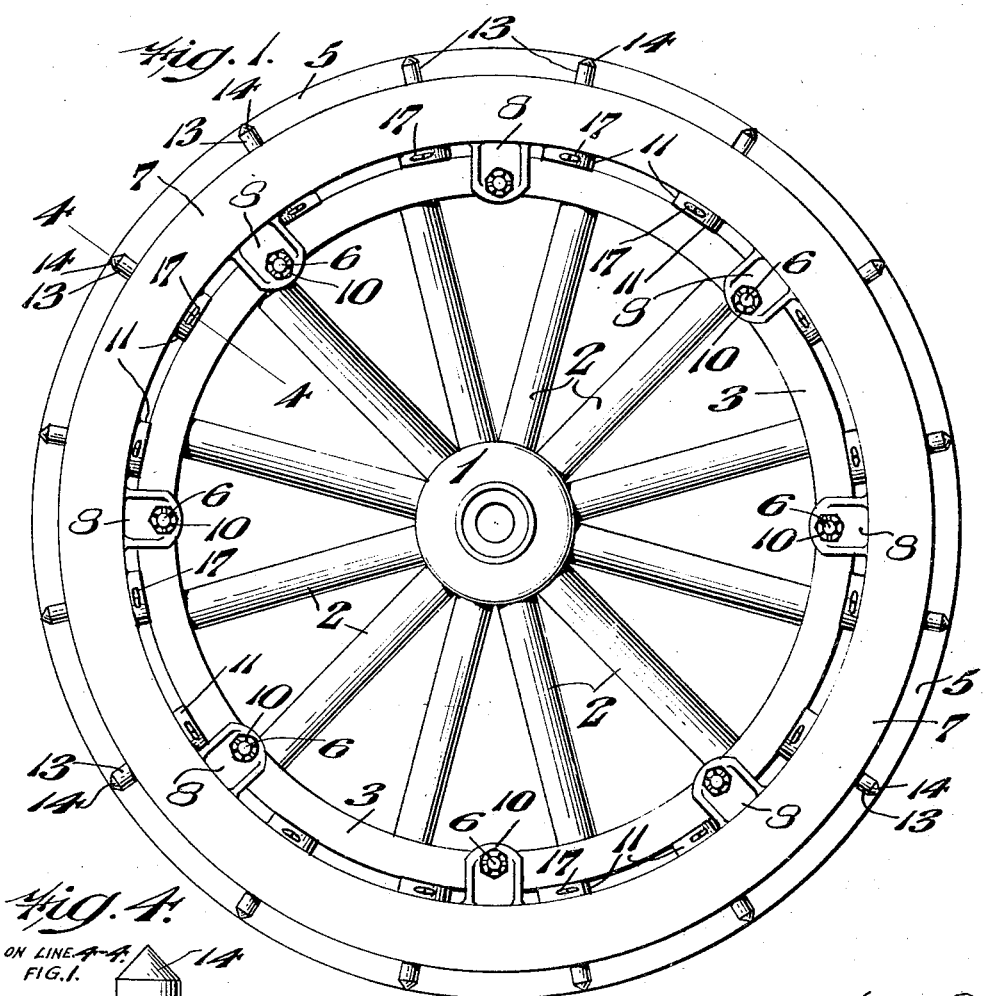
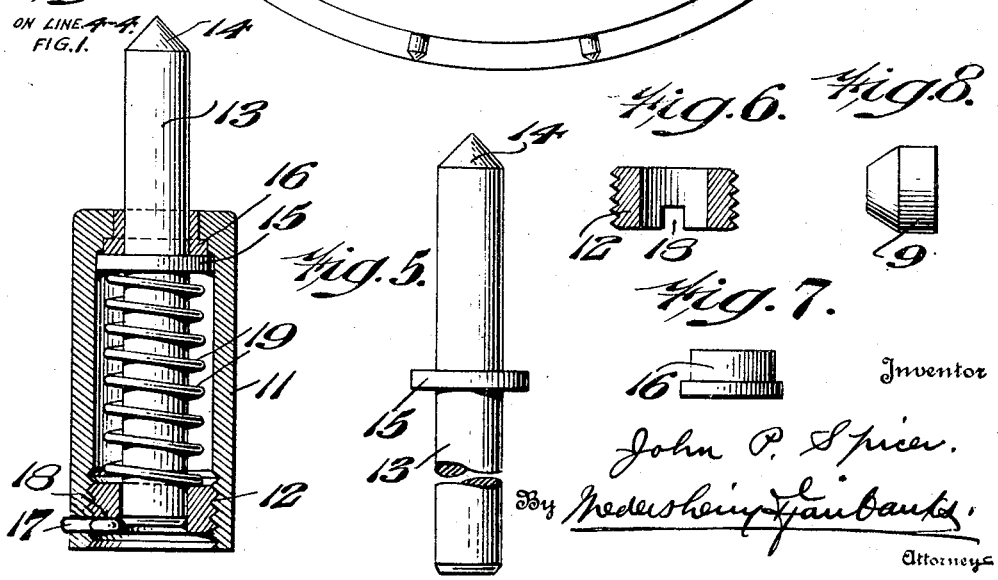

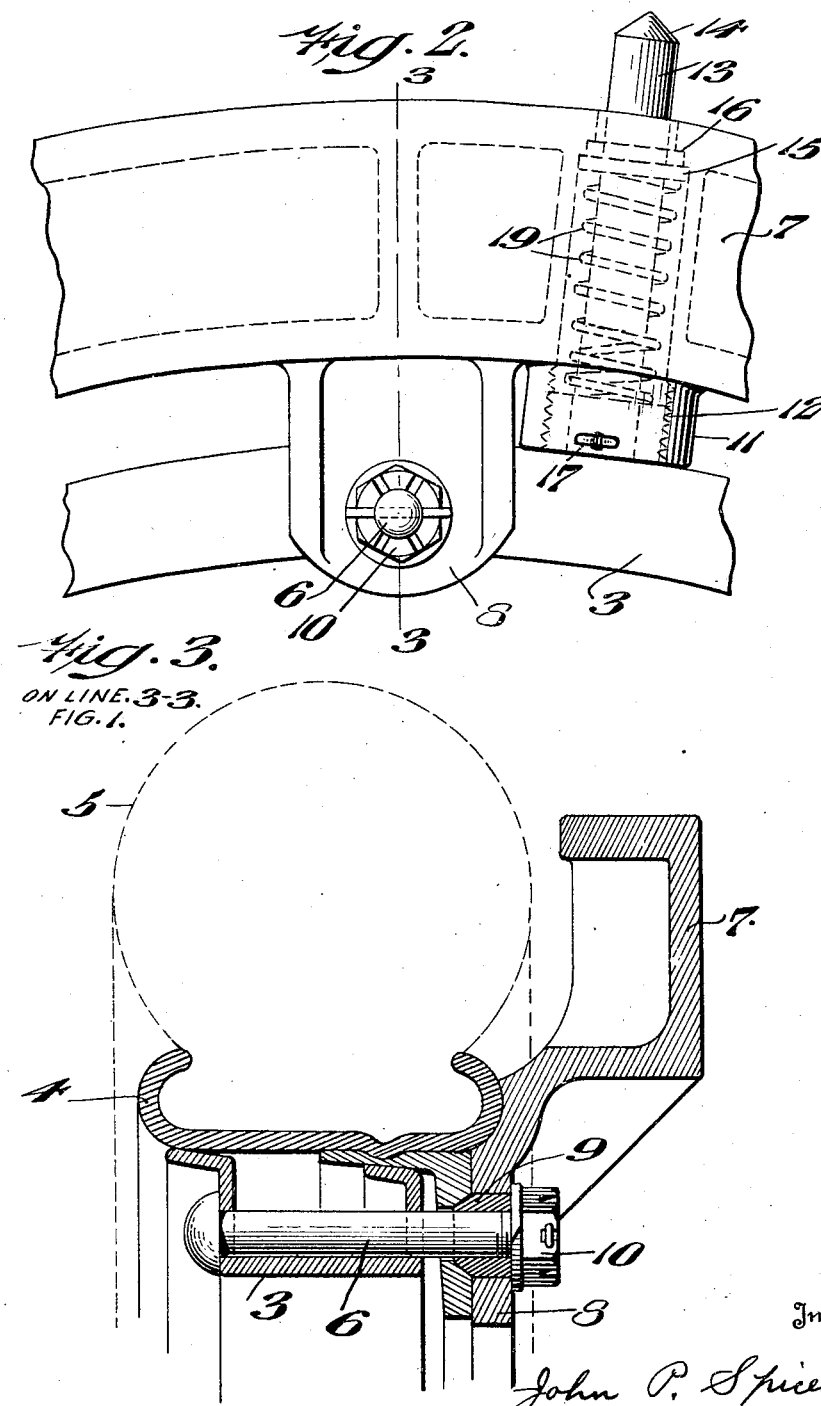

Patented May 27, 1930

1,760,666

UNITED STATES PATENT OFFICE

JOHN P. SPICER, OF PHILADELPHIA, PENNSYLVANIA, ASSIGNOR, BY MESNE ASSIGNMENTS, OF ONE-HALF TO JOHN P. SPICER, ONE-FOURTH TO ALBIN H. CORNOG, AND ONE-FOURTH TO ADELAIDE V. ENGLE CORNOG

SAFETY EMERGENCY ATTACHMENT FOR WHEELS

Application filed April 3, 1925. Serial No. 20,315.

This invention, stated in its broadest terms, relates to a safety emergency attachment for automobile wheels and has more especial relation to the type of attachment shown, described, and claimed in Patent No. 1,404,802, granted to J. P. Spicer, under date of January 31, 1922.

The leading object of the present invention may be said to reside in the provision of a device of the character stated adapted for attachment to motor vehicle wheels, and especially designed for use upon roads or highways composed chiefly of dirt which frequently become soft and muddy so that proper traction of automobile wheels cannot be maintained.

Other and further objects of the present invention reside in the provision of general details of construction and arrangement and combination of parts for attaining the results sought by the leading object.

Other and still further objects not at this time more particularly referred to will appear hereinafter.

The invention consists of the novel construction hereinafter described and finally claimed.

The nature, characteristic features and scope of the invention will be more fully understood from the following description taken in connection with the accompanying drawings forming part hereof, and in which:

Fig. 1, is a view in side elevation of a motor vehicle wheel equipped with a device embodying the invention.

Fig. 2, is a fragmentary view drawn on an enlarged scale, illustrating details of construction in Fig. 1.

Fig. 3, is a view in cross section taken upon the line 3—3 of Fig. 2.

Fig. 4, is a view in section taken upon the line 4—4 of Fig. 1.

Fig. 5, is a detail view of the spring pressed pin shown in Fig. 4.

Fig. 6, is a detached view of the screw threaded ring shown at the lower portion of Fig. 4.

Fig. 7, is a detail view of the sleeve shown at the upper portion of Fig. 4; and Fig. 8, is a detail view of the sleeve shown at the right hand side side of Fig. 3.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized without departing from the spirit or scope of my invention.

Referring now to the drawings in detail, the reference numeral 1 designates the hub of any desired form of motor vehicle, 2 the spokes, and 3 the felly thereof. Carried by the felly 3 is a rim 4 to accommodate a detachable tire 5 of any desired form. Detachably fixed with respect to the felly 3 as by means of a plurality of bolts 6 is an annular casting 7 arranged in concentric relation with respect to the tire 5 and in spaced relation therefrom. The annular casting 7 is provided with a plurality of lugs 8 apertured for bolt reception. The apertures of the lugs 8 are a trifle larger than the diameter of the bolts 6 so that tapered sleeves 9, see Fig. 8, may be fitted around the bolts 6 and be passed through the apertures of the casting 7. Thus, when the nuts 10 are tightened the casting 7 may be positively clamped with respect to felly 3. The casting 7 is rigidly provided with a plurality of cylindrical casings 11, see Fig. 4, internally screw-threaded to receive the screw threaded sleeves 12, shown in Fig. 6. Within each cylinder 11 is arranged a spring pressed rod 13 having a pointed end 14, see Fig. 5, each of which rods 13 is provided with a shoulder 15 for abutting against the inner side of a sleeve 16 fitted to the outer end of each cylinder 11. The sleeves 16 are best seen in Fig. 7. Thus, with a rod positioned within a cylinder 11, proper adjustment of sleeves 12 would provide proper tension upon the spring pressed rods 13 as is readily apparent. In order to maintain the sleeves 12 in proper position when adjusted, use is made of pins 17, see Fig. 4. These pins 17 are accommodated by the slotted portions 18 of casings 11. From the above described construction of parts it is apparent that as a vehicle wheel moves over the ground the rods 13 move in a direction toward the hub of the vehicle wheel because of the springs 19. Obviously, if it be a soft, muddy road the rods 13 will dig into the soft, muddy substance and thus provide proper traction mediums as is readily apparent. The pins 17 serve as set screws to prevent the rotation and working loose of the sleeve 12 which is threaded to the end of the casing 11, said pins 17 engaging the aligning slots in the ends of said casings and in said threaded sleeves 12.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:

An attachment for wheels comprising an annular member having a plain exterior surface and being of channel cross section, the open side of said annular member facing said wheel, and a plurality of cylindrical casings formed integral with and concealed from view by said annular member, each of said cylindrical casings having at its outer end a flanged opening, a flanged bushing fitting in said opening, a spring pressed pin having its outer end pointed and having a shoulder intermediate its ends abutting against said bushing, the inner portion of said pin being disposed within said casing, a vertically slotted sleeve threaded into the other end of said casing and adapted to maintain said pin in position, and fastening devices common to said casing and said sleeve.

In testimony whereof, I have hereunto signed my name.

JOHN P. SPICER.